United States Patent
Tanaka et al.

(10) Patent No.: US 7,779,202 B2
(45) Date of Patent: Aug. 17, 2010

(54) APPARATUS AND METHOD FOR CONTROLLING DISK ARRAY WITH REDUNDANCY AND ERROR COUNTING

(75) Inventors: Kazuyuki Tanaka, Tachikawa (JP); Takehiko Kurashige, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 267 days.

(21) Appl. No.: 11/401,542

(22) Filed: Apr. 11, 2006

(65) Prior Publication Data

US 2006/0236161 A1    Oct. 19, 2006

(30) Foreign Application Priority Data

Apr. 15, 2005   (JP)   ............... 2005-118639

(51) Int. Cl.
*G06F 12/00* (2006.01)
(52) U.S. Cl. ............... 711/114; 711/163; 711/E12.103; 714/5; 714/6; 714/7; 714/E11.004
(58) Field of Classification Search ........................ None
See application file for complete search history.

(56) References Cited

U.S. PATENT DOCUMENTS

| | | | |
|---|---|---|---|
| 5,802,264 A | | 9/1998 | Chen et al. |
| 6,233,108 B1 | | 5/2001 | Inoue |
| 7,383,380 B2 | * | 6/2008 | Yagisawa et al. ............ 711/114 |
| 2003/0105922 A1 | * | 6/2003 | Tomita ........................ 711/114 |
| 2005/0081087 A1 | | 4/2005 | Yagisawa et al. |
| 2005/0086557 A1 | * | 4/2005 | Sato et al. ....................... 714/6 |

FOREIGN PATENT DOCUMENTS

| | | |
|---|---|---|
| JP | 5-204554 | 8/1993 |
| JP | 07-200191 | 8/1995 |
| JP | 07-295761 | 11/1995 |
| JP | 09/044317 | 2/1997 |
| JP | 10-333841 | 12/1998 |

(Continued)

OTHER PUBLICATIONS

Japanese Office Action dated Feb. 9, 2010 for application No. 2005-118639 (U.S. Appl. No. 11/401,542), entitled Apparatus and Method for Controlling Disk Array with Redundancy. (English Translation).

(Continued)

*Primary Examiner*—Shawn X Gu
(74) *Attorney, Agent, or Firm*—Blakely, Sokoloff, Taylor & Zafman LLP (57) ABSTRACT

According to one embodiment, a read/write control unit controls read/write access to at least two disk drives that provide a disk array. Error counters are provided for the respective disk drives for counting respective numbers of errors if the errors occur when the disk drives are accessed. A failure estimation unit detects, as a disk drive which is very likely to fail, a disk drive included in the disk array and having a high error occurrence degree, based on the numbers of errors counted by the error counters. A mode-setting unit sets the detected disk drive in a particular mode in which the detected disk drive is maintained as a member of the disk array and is made more inaccessible than the remaining disk drive of the disk array.

16 Claims, 9 Drawing Sheets

FOREIGN PATENT DOCUMENTS

| | | | | |
|---|---|---|---|---|
| JP | 10333841 A | * | 12/1998 | |
| JP | 11-184643 | | 9/1999 | |
| JP | 2000-056935 | | 2/2000 | |
| JP | 2004-185477 | | 7/2004 | |
| JP | 2004185477 A | * | 7/2004 | |
| JP | 2004-325939 | | 11/2004 | |
| JP | 2004325939 A | * | 11/2004 | |
| JP | 2005-100259 | | 4/2005 | |
| JP | 2005100259 A | * | 4/2005 | |

OTHER PUBLICATIONS

Japanese Patent Application No. 2005-118639, Decision of Rejection, mailed Apr. 27, 2010 (English translation).

* cited by examiner

APPARATUS AND METHOD FOR CONTROLLING DISK ARRAY WITH REDUNDANCY AND ERROR COUNTING

CROSS-REFERENCE TO RELATED APPLICATIONS

This application is based upon and claims the benefit of priority from Japanese Patent Application No. 2005-118639, filed Apr. 15, 2005, the entire contents of which are incorporated herein by reference.

BACKGROUND

1. Field

One embodiment of the invention relates to an apparatus and method, for example, for controlling a disk array with redundancy formed of a plurality of disk drives.

2. Description of the Related Art

A disk array with redundancy (redundant disk array) is known as a technique for enhancing the reliability of data using redundant data. The disk array is formed of a plurality of disk drives and known as a redundant array of inexpensive disks or redundant array of independent disks (RAID). A certain number of levels (RAID levels) are set for the RAID. For example, RAID1 (mirroring) or RAID5 (striping with parity) are known. In any RAID level, data and redundant data are assigned to a disk array formed of a plurality of disk drives, which enables data to be restored if a failure occurs in any one of the disk drives.

The controller for controlling the disk array is called an array controller or RAID controller. When, for example, a medium error occurs during access to a disk drive included in a disk array, the RAID controller restores data stored in the error occurrence area of the disk drive, using data in another disk drive. As a typical medium error, an error is known in which data cannot be read from a disk drive even if a retry is performed at the disk drive side.

If, for example, many medium errors occur in a certain disk drive included in a disk array, much time is required for restoration, therefore a command from a host (host system) that uses the disk array cannot be processed quickly. Jpn. Pat. Appln. KOKAI Publication No. 7-200191 discloses a technique for quickly detecting a disk drive that may fail. This technique (hereinafter referred to as prior art) is characterized in that a RAID controller (array controller) manages the number of errors that occur in each disk drive included in a disk array. The technique is also characterized in that if there is a disk drive in which the number of errors exceeds a preset threshold value, the RAID controller recognizes that it is very possible that the disk drive will fail. The technique is further characterized in that the RAID controller restore, to a spare disk drive, data stored in the disk drive recognized to be very likely to fail, using data stored in another disk drive of the disk array. This prior technique is free from the problem that many medium errors occur and much time is required for data restoration.

In the prior technique, assume that a read request is issued from the host to the RAID controller during a rebuild process for rebuilding, in a spare disk drive, the data stored in a disk drive recognized to be very likely to fail. In this case, the read request is executed in each disk drive of the disk array that includes the recognized disk drive. At this time, the disk drive recognized to be very likely to fail is treated in the same manner as the other normal disk drives, namely, accessed in the same manner as the normal disk drives.

This may well accelerate the time when the recognized disk drive actually fails. Moreover, if the recognized disk drive fails before the above-mentioned rebuild process is completed, the rebuild process is continued without using the redundancy function. At this time, if a medium error occurs in any other disk drive of the disk array, data rebuilding may not be performed.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided an array controller for controlling a disk array with redundancy including at least two disk drives. The array controller comprises: a read/write control unit which controls read/write access to the disk drives; error counters provided for the respective disk drives, the error counters counting respective numbers of errors if the errors occur when the disk drives are accessed; a failure estimation unit configured to detect, as a disk drive which is very likely to fail, a disk drive included in the disk array and having a high error occurrence degree; and a mode-setting unit which sets the detected disk drive in a particular mode in which the detected disk drive is maintained as a member of the disk array and is made more inaccessible than a remaining disk drive of the disk array.

FIRST EMBODIMENT

Figure 1:
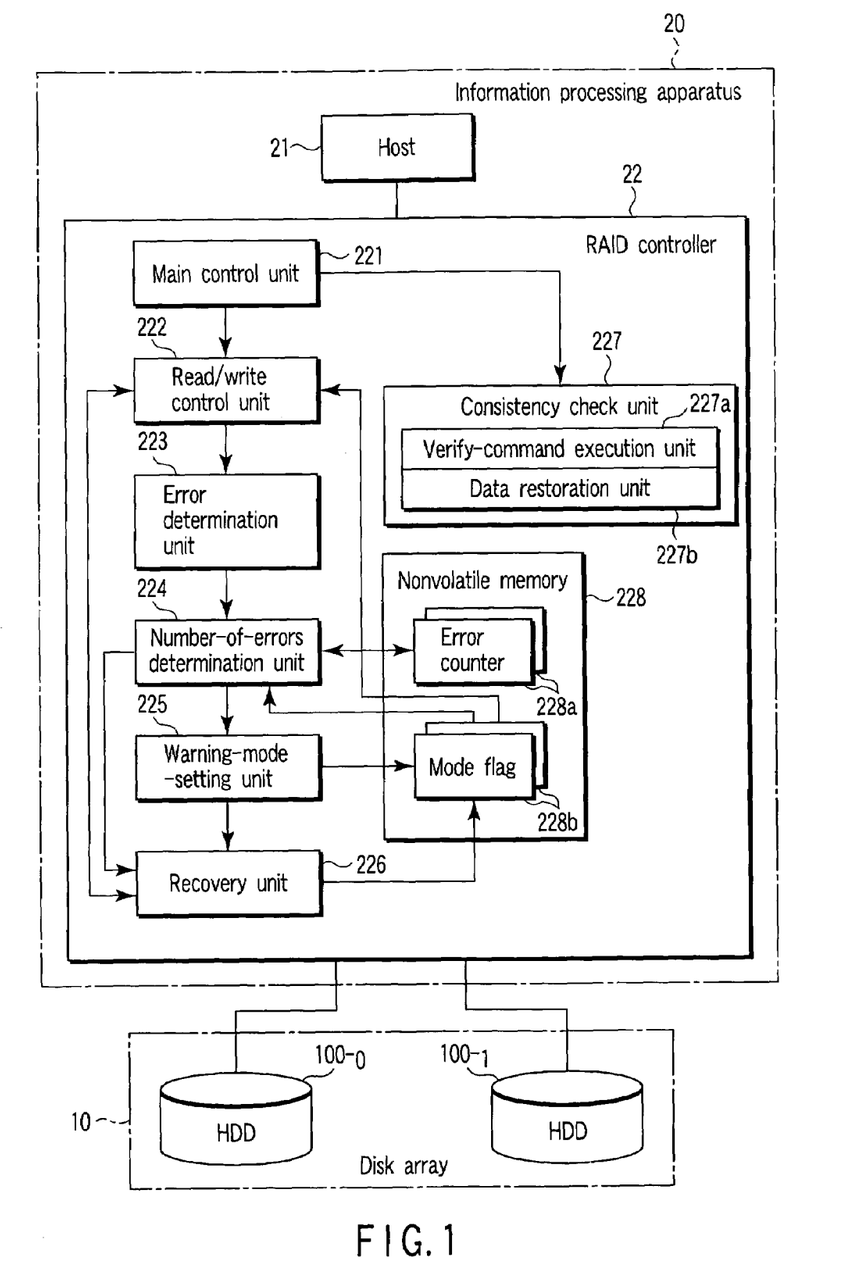
FIG. 1 is an exemplary block diagram showing the configuration of an information processing system according to a first embodiment of the invention.

Referring now to some of the accompanying drawings, a first embodiment of the invention will be described. FIG. 1 is a block diagram showing the configuration of an information processing system according to the first embodiment of the invention. As shown, the information processing system comprises a disk array 10 and information processing apparatus 20. However, the disk array 10 may be built in the information processing apparatus 20. Namely, the information processing apparatus 20 may include the disk array 10.

The disk array 10 is a RAID formed of at least two hard disk drives (HDDs) 100-0 and 100-1. The disk array 10 in the embodiment functions as disk array of RAID1, so-called mirroring disk array. The HDDs 100-0 and 100-1 include respective display devices for displaying their statuses, such as LEDs (not shown).

The information processing apparatus 20 comprises a host (host system) 21 and RAID controller (array controller) 22. The host 21 executes various applications, and uses the disk array 10 as its external storage. The RAID controller 22 is connected to the disk array 10 and host 21. The RAID controller 22 controls the disk array 10 in accordance with an access request from the host 21.

The RAID controller 22 comprises a main control unit 221, read/write control unit 222, error determination unit 223, number-of-errors determination unit 224, warning-mode-setting unit 225, recovery unit 226, consistency check unit 227 and nonvolatile memory 228. The main control unit 221 receives a command issued from the host 21 and controls the other units incorporated in the RAID controller 22.

In accordance with a read/write command issued from the host 21 and received by the main control unit 221, the read/write control unit 222 controls read/write access to at least one of the HDDs 100-0 and 100-1. The error determination unit 223 determines whether there is an error during access to each of the HDDs 100-0 and 100-1. The number-of-errors determination unit 224 manages the number of errors concerning each of the HDDs 100-0 and 100-1 determined by the error determination unit 223. The number-of-errors determination unit 224 determines whether the number of errors exceeds a preset threshold value. At this time, the unit 224 functions as a failure estimation unit for detecting an HDD that is very likely to fail.

Based on the determination result of the number-of-errors determination unit 224, the warning-mode-setting unit 225 sets a warning mode for an HDD in which the number of errors exceeds the preset threshold value (i.e., an HDD of a high error-occurrence degree). The warning mode means a particular mode for retarding the time when an HDD, in which the number of errors exceeds the preset threshold value, and hence which is estimated to be very likely to fail, actually fails. In other words, the warning mode is a particular mode for elongating the life of the HDD. In the warning mode, the HDD that is estimated to be very likely to fail is maintained as a member of the disk array 10 like the remaining HDD of the disk array 10, and set as inaccessible as possible, compared to the remaining HDD.

When an error occurs during read/write access, the recovery unit 226 executes a recovery process for recovery from the error. The consistency check unit 227 checks the consistence of data between the HDDs 100-0 and 100-1. The consistency check unit 227 includes a verify-command execution unit 227a and data restoration unit 227b. When one of the HDDs 100-0 and 100-1 is in the warning mode, the verify-command execution unit 227a executes a verify command on the other HDD (i.e., the HDD in the normal mode) for simple consistency determination, described later. The data restoration unit 227b restores the data in the area included in the HDD in the normal state and determined to be an error occurrence area by the verify command execution performed on the HDD, using the data in the corresponding area of the other HDD.

The nonvolatile memory 228 is a rewritable nonvolatile memory (storage unit) such as a flash ROM. Alternatively, the nonvolatile memory 228 may be a RAM backed up by a battery. A predetermined area in the nonvolatile memory 228 is used to hold a pair of error counters 228a for counting the numbers of errors occurring in the HDDs 100-0 and 100-1, respectively. Another predetermined area in the nonvolatile memory 228 is used to hold a pair of mode flags 228b for designating modes indicating the respective states of the HDDs 100-0 and 100-1. In this embodiment, a normal mode, warning mode and failure mode can be designated by each mode flag 228b. As mentioned above, the normal mode indicates that the HDD 100-i (i=1, 2) is in the normal state. The warning mode indicates that the HDD 100-i is very likely to fail and should be made as inaccessible as possible, compared to the other HDD. However, the HDD 100-i in the warning mode is maintained as a member of the disk array 10, and not separated from the disk array 10. The failure mode indicates that the HDD 100-i is separated from the disk array 10.

Figure 2:
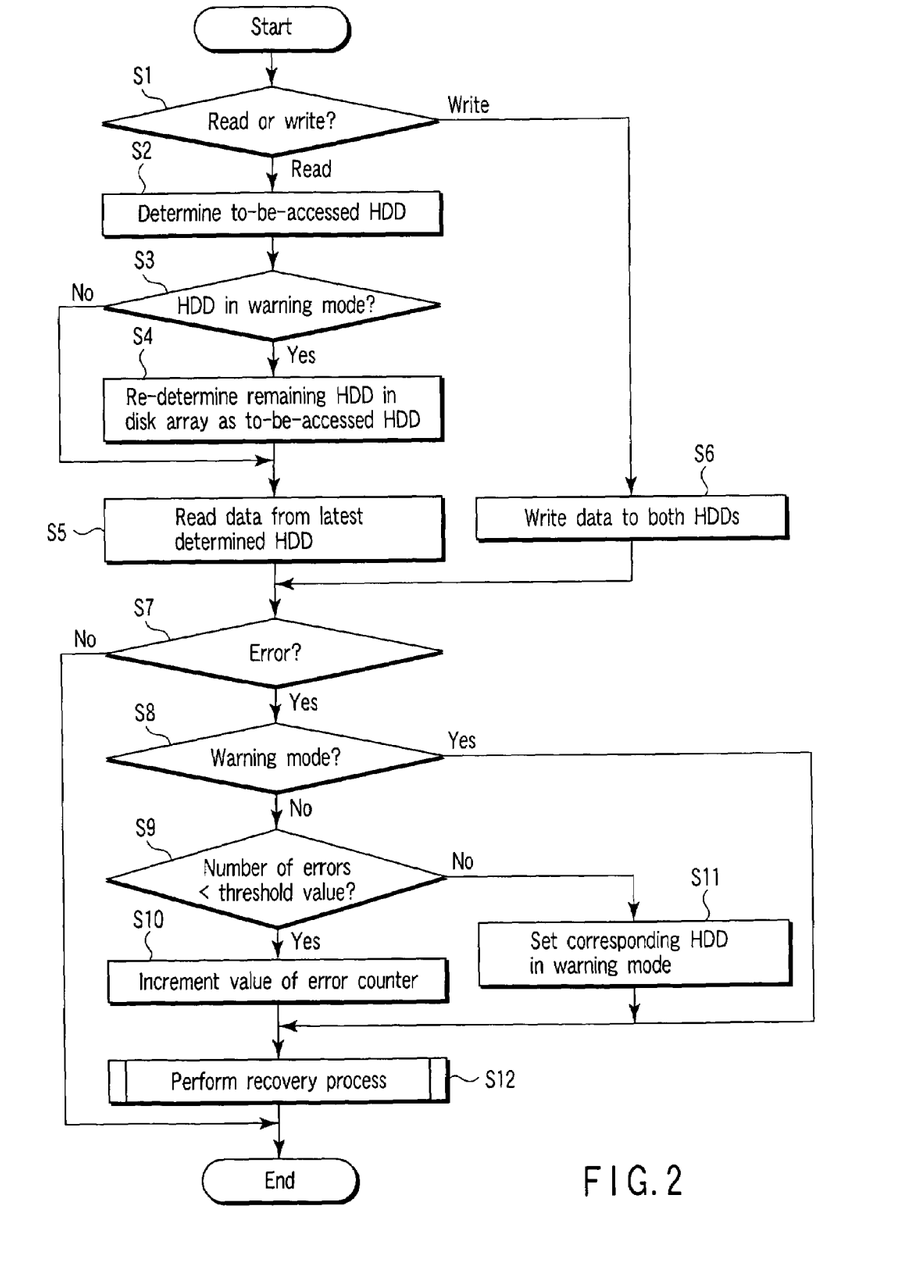
FIG. 2 is an exemplary flowchart showing the procedure for operating a RAID controller 22 in the first embodiment.

Referring to the flowchart of FIG. 2, a description will be given of the procedure for operating the RAID controller 22 in the system of FIG. 1, using, as an example, a case where the main control unit 221 of the RAID controller 22 receives a read or write command from the host 21. Upon receiving a read or write command from the host 21, the main control unit 221 requests the read/write control unit 222 to read or write data designated by the command. The read/write control unit 222, in turn, determines whether data reading or data writing is requested (step S1).

Assume here that data reading is requested (step S1). In this case, the read/write control unit 222 functions as an HDD (disk drive) determination unit and determines whether the HDD 100-0 or 100-1 included in the disk array 10 should be accessed (step S2). In this embodiment, the read/write control unit 222 determines the to-be-accessed HDD so that the frequency of access to the HDD 100-0 will be equal to that of access to the HDD 100-1. As a result, concentration of load on one of the HDDs 100-0 and 100-1 can be avoided. In this embodiment, each of the disk areas of the HDDs 100-0 and 100-1 is divided into preset-size areas. Depending upon, for example, whether the logical address to be accessed indicates an area of an even number or an area of an odd number, the read/write control unit 222 determines the to-be-accessed HDD.

Subsequently, the read/write control unit 222 functions as a mode determination unit and determines whether the determined HDD is in the warning mode (step S3). This determination can be executed referring to the mode flag 228b corresponding to the determined HDD. Firstly, assume that the HDD is in the warning mode (step S3). In this case, the read/write control unit 222 functions as a switching unit, and switches the to-be-accessed HDD to the remaining (i.e., another) HDD of the disk array 10 to make the determined HDD as inaccessible as possible (i.e., to prevent access to the determined HDD) (step S4). Thus, the read/write control unit 222 re-determines, as the to-be-accessed HDD, the remaining HDD in the disk array 10.

If the read/write control unit 222 re-determines the to-be-accessed HDD (step S4), it controls reading of data from the re-determined HDD, i.e., the latest determined HDD (step S5). As a result, reading of data from the HDD in the warning mode is prevented. At this time, data is read from the block area included in the re-determined HDD and corresponding to the block area in the to-be-accessed HDD (i.e., the HDD in the warning mode). Namely, the address (block address) of the former block area is identical to that of the latter block area in the originally to-be-accessed HDD in the warning mode. In the embodiment in which the disk array 10 functions as a RAID1 disk array, the read data is identical to the data stored in the corresponding block area of the originally to-be-accessed HDD. In summary, when a to-be-accessed HDD is re-determined (switched), the read/write control unit 222 functions as a data acquisition unit, and acquires data to be read from the originally to-be-accessed HDD (i.e., the HDD in the warning mode), based on the data read from the re-determined HDD and the redundancy of the disk array 10.

In contrast, if the HDD determined at step S2 is not in the warning mode (step S3), the read/write control unit 222 skips over step S4. At this time, the read/write control unit 222 controls reading of data from the HDD determined at step S2 (i.e., the latest determined HDD) (step S5).

When data reading is requested, the read/write control unit 222 may determine whether there is an HDD set in the warning mode. If there is an HDD set in the warning mode, it is sufficient if the read/write control unit 222 determines that the other HDD, which is not set in the warning mode, is a to-be-accessed HDD. If there is no HDD set in the warning mode, it is sufficient if the read/write control unit 222 determines the to-be-accessed HDD as at step S2.

Secondly, assume that the main control unit 221 has requested the read/write control unit 222 to write data, in accordance with a write command issued from the host 21 (step S1). At this time, the read/write control unit 222 controls writing of data to both the HDDs 100-0 and 100-1 included in the disk array 10 (step S6). Specifically, the read/write control unit 222 writes the same data to the block areas of the HDDs 100-0 and 100-1 designated by the same address. As a result, data redundancy is maintained in the HDDs 100-0 and 100-1.

Figure 3A:
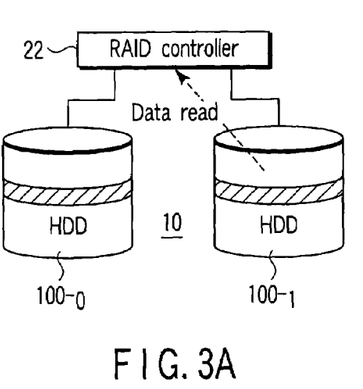
FIG. 3A is a view showing an exemplary state in which HDDs 100-0 and 100-1 included in a disk array 10 are simultaneously accessed during data reading in the first embodiment.
Figure 3B:
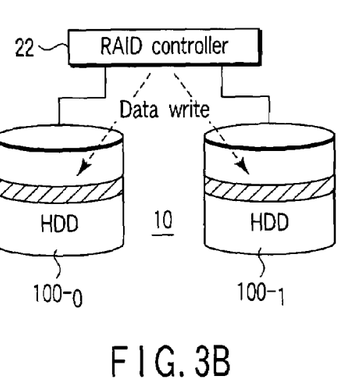
FIG. 3B is a view showing an exemplary state in which the HDDs 100-0 and 100-1 included in the disk array 10 are simultaneously accessed during data writing in the first embodiment.

As described above, in the first embodiment in which the disk array 10 functions as a RAID1 disk array, when data reading is performed, data is read from one of the block areas of the HDDs 100-0 and 100-1 designated by the same block address. FIG. 3A shows an example in which data is read from the HDD 100-1. On the other hand, when data writing is performed, data is written to the block areas of the HDDs 100-0 and 100-1 designated by the same block address. FIG. 3B shows an example of such data writing. In the first embodiment, reading of data from one of the HDDs 100-0 and 100-1 is utilized in the following manner. When there is an HDD set in the warning mode, data is read from an HDD set in the normal mode so as not to accelerate the time when the HDD in the warning mode actually fails. As a result, the number of recovery processes can be reduced, which are performed upon occurrence of errors during access to the HDD set in the warning mode (i.e., the HDD that is very likely to fail). Namely, delays, due to the recovery processes, in the operations of the host 21 can be avoided.

When data reading or writing is executed at step S5 or S6, the error determination unit 223 determines whether an error occurs during data reading or writing (i.e., during a disk access) (step S7). In the case of, for example, data reading, a medium error or cyclic redundancy check (CRC) error is known as the error. The medium error occurs when a read retry is performed after a read error occurs in the HDD 100-*i*, and is ended in failure. At this time, the HDD 100-*i* reports the error to the RAID controller 22. The CRC error occurs when data is normally read from the HDD 100-*i* but not normally transmitted to the RAID controller 22 because of, for example, a failure in the transmission line. Further, in the case of data writing, an error in which data can be written to neither a designated area nor an alternate area is well known.

When an error occurs in the HDD 100-*i* during data reading or writing by the read/write control unit 222 (step S7), the error determination unit 223 reports this to the number-of-errors determination unit 224 along with identification information concerning the HDD 100-*i*. The number-of-errors determination unit 224, in turn, refers to the mode flag 228*b* corresponding to the HDD 100-*i*, thereby determining whether the HDD 100-*i* is set in the warning mode (step S8).

Assume here that the HDD 100-*i*, in which the error has occurred, is not set in the warning mode. Namely, assume that the HDD, in which the error has occurred, is set in the normal mode. In this case, the number-of-errors determination unit 224 refers to the error counter 228*a* corresponding to the HDD 100-*i* with the error, thereby determining whether the number of errors indicated by the error counter 228*a* is less than a preset threshold value (step S9). The error counter 228*a* corresponding to the HDD 100-*i* with the error indicates the number of errors that have occurred so far in the HDD 100-*i*.

If the number of errors is less than the threshold value, the number-of-errors determination unit 224 increments the value of the error counter 228*a* (step S10). In contrast, if the number of errors is not less than the threshold value (step S9), the number-of-errors determination unit 224 determines that the number of errors including the present error exceeds the threshold value. At this time, the number-of-errors determination unit 224 recognizes that the possibility of actual failure of the HDD 100-*i* with the error is strong, and reports this to the warning-mode-setting unit 225, along with the identification information concerning the HDD 100-*i*. Instead of the total number of errors, the number of errors per unit time, i.e., the frequency of occurrence of errors, may be used.

Upon receiving the report from the number-of-errors determination unit 224, the warning-mode-setting unit 225 sets the HDD 100-*i* with the error in the warning mode (step S11). This is realized by setting the mode flag 228*b*, corresponding to the HDD 100-*i* with the error, in the status indicating the warning mode. In this embodiment, the warning-mode-setting unit 225 sets, in a "warning" display status, the LED (status display LED) indicating the error occurrence status of the HDD 100-*i*.

The recovery unit 226 is activated when the number-of-errors determination unit 224 has executed step S10. The recovery unit 226 is also activated when warning-mode-setting unit 225 has executed step S11. The recovery unit 226 is also activated when the number-of-errors determination unit 224 has determined at step S8 that the HDD 100-*i* with the error is already set in the warning mode. When activated, the recovery unit 226 executes a recovery process for recovery from the error (step S12).

Figure 4:
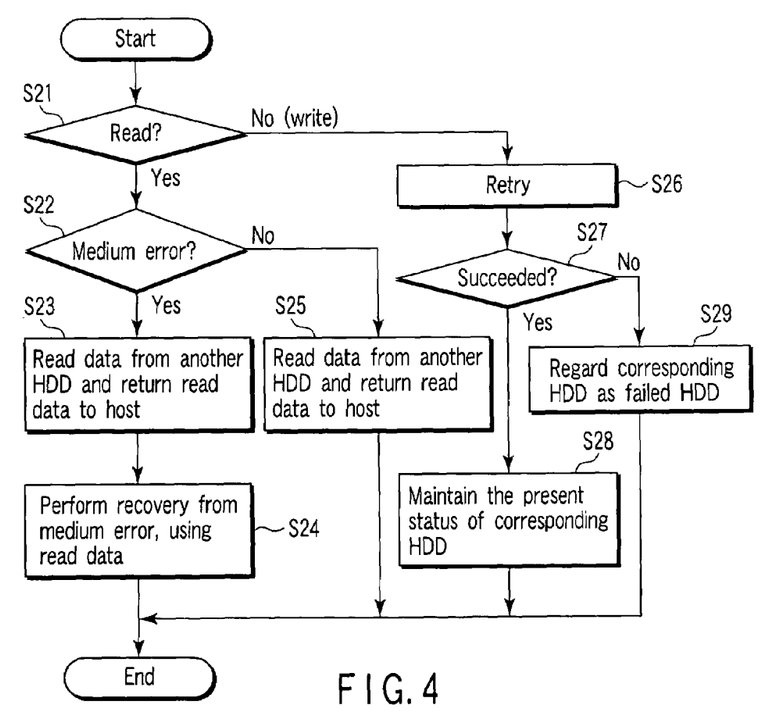
FIG. 4 is an exemplary flowchart showing the procedure of the recovery process employed in the flowchart of FIG. 2.

Referring then to the flowchart of FIG. 4, the procedure of the recovery process (step S12) by the recovery unit 226 will be described. Assume here that an error has occurred in one of the HDDs 100-*i*, e.g., the HDD 100-0. Firstly, the recovery unit 226 determines whether the error has occurred during data reading or data writing (step S21). If the error has occurred during data reading, the recovery unit 226 determines whether the error is a medium error (step S22).

If the error in the HDD 100-0 is a medium error (step S22), the recovery unit 226 executes step S23. Namely, at step S23, the recovery unit 226 causes the read/write control unit 222 to read data from the area in the remaining HDD 100-1 of the disk array 10 corresponding to the area of the HDD 100-0 in which the error has occurred, and then causes the main control unit 221 to return the read data to the host 21. Subsequently, the recovery unit 226 executes step S24. At step S24, the recovery unit 226 writes the data, read from the HDD 100-1, to the error occurrence area of the HDD 100-0, using the read/write control unit 222, thereby recovering the data in the error occurrence area of the HDD 100-0. Thus, the recovery unit 226 recovers the HDD 100-0 from the medium error, using the data read from the HDD 100-1.

In contrast, if the error occurring in the HDD 100-0 is, for example, a CRC error, which differs from the medium error (step S22), the recovery unit 226 executes step S25 similar to the above-described step S23. Namely, at step S25, the recovery unit 226 causes the read/write control unit 222 to read data from the area in the HDD 100-1 corresponding to the error occurrence area of the HDD 100-0, and then causes the main control unit 221 to return the read data to the host 21. In the case of an error other than the medium error, reading of data from the HDD 100-0 may be retried.

On the other hand, if an error has occurred during data writing (step S21), the recovery unit 226 retries writing of data to the HDD 100-0 (step S26). If the retry of data writing has succeeded (step S27), the recovery unit 226 maintains the status of the HDD 100-0 as it is (step S28). Namely, the recovery unit 226 maintains the normal mode of the HDD 100-0 if the HDD 100-0 is set in the normal mode, and maintains the warning mode of the HDD 100-0 if the HDD 100-0 is set in the warning mode.

In contrast, if the retry of data writing has failed (step S27), the recovery unit 226 regards the HDD 100-0 as out of order (step S29). Namely, the recovery unit 226 sets the HDD 100-0 in a failure mode in which the HDD 100-0 is separated from the disk array 10. This is realized by setting the mode flag 228b, corresponding to the HDD 100-0, in the status indicating the failure mode. In this embodiment, the warning-mode-setting unit 225 sets, in a "failure" display status, the status display LED of the HDD 100-0.

Figure 5A:
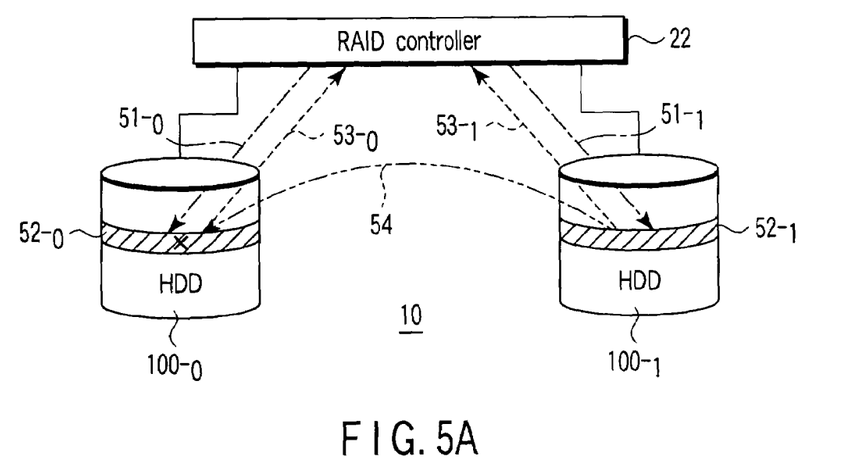
FIG. 5A is a view useful in explaining an exemplary operation of a consistency check unit 227 in a normal state of the first embodiment.
Figure 5B:
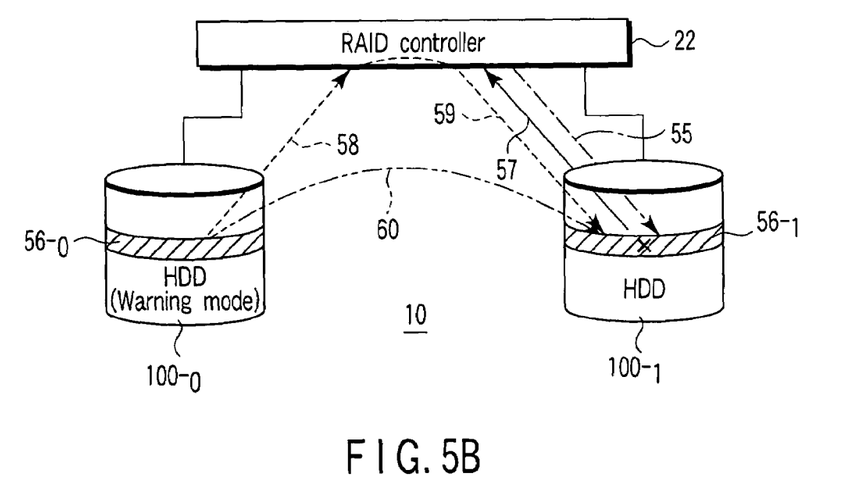
FIG. 5B is a view useful in explaining an exemplary operation of the consistency check unit 227 in a warning mode of the first embodiment.

Referring then to FIGS. 5A and 5B, a description will be given of the operations performed by the consistency check unit 227 during, for example, (1a) a normal time and (1b) a warning-mode-set time.

(1a) Normal Time

The normal time means the time when both the HDDs 100-0 and 100-1 are in the normal mode. In this case, the consistency check unit 227 issues read commands 51-0 and 51-1 to the HDDs 100-0 and 100-1, respectively. By issuing the read commands 51-0 and 51-1, the consistency check unit 227 performs data reading 53-0 and data reading 53-1 for reading data from corresponding areas 52-0 and 52-1 of the HDDs 100-0 and 100-1, respectively. If a medium error has occurred in one of the HDDs 100-0 and 100-1 because of data reading 53-0 and data reading 53-1, the consistency check unit 227 restores the data in which the medium error has occurred, using the other read data. In the example of FIG. 5A, assume that a medium error has occurred in hatched area 52-0 with mark x of the HDD 100-0. In this case, the data restoration unit 227b of the consistency check unit 227 writes, to area 52-0 of the HDD 100-0, the data read from the corresponding hatched area 52-1 included in the HDD 100-1. Thus, data restoration 54 of area 52-0 of the HDD 100-0 is realized. The consistency check unit 227 iterates issuing of read commands to the HDDs 100-0 and 100-1, while switching the to-be-accessed areas.

(1b) Warning-Mode-Set Time

The warning-mode-set time means the time when one of the HDDs 100-0 and 100-1 is in the warning mode. In the embodiment, the HDD set in the warning mode is controlled to be as inaccessible as possible. In the warning mode, a verify-command execution unit 227a included in the consistency check unit 227 operates. The verify-command execution unit 227a issues a verify command only to the HDD in the normal mode, instead of issuing a read command. In the example of FIG. 5B, the HDD 100-0 is in the warning mode. In this case, the verify-command execution unit 227a issues a verify command 55 only to the HDD 100-1.

The verify command 55 is used to cause the buffer memory of the HDD designated by the command 55, i.e., the HDD 100-1, to read the data from the corresponding area of the HDD 100-1 to thereby determine whether the read data contains an error. The verify command 55 is also used to cause the designated HDD to report the determination result (i.e., the execution result) to the RAID controller 22. In this point, the verify command 55 differs from the read command for transferring data from the designated HDD to the RAID controller 22.

In the example of FIG. 5B, it is assumed that the verify command 55 is issued to check area 56-1 of the HDD 100-1. Assume here that data cannot be normally read from area 56-1 of the HDD 100-1 designated by the verify command 55, and an error 57 is reported from the HDD 100-1 to the RAID controller 22.

The data restoration unit 227b of the consistency check unit 227 executes data reading 58 using the read/write control unit 222, only if the HDD 100-1 generates the error 57 in response to the verify command 55. During data reading 58, data is read from area 56-0 of the HDD 100-0 corresponding to area 56-1 of the HDD 100-1 (in which the error 57 has occurred). Subsequently, the data restoration unit 227b causes the read/write control unit 222 to execute data writing 59. During data writing 59, the data read from area 56-0 of the HDD 100-0 is written to area 56-1 of the HDD 100-1. Thus, data restoration 60 is realized in area 56-1 of the HDD 100-1.

As described above, in the first embodiment, in the warning mode, only the HDD in the normal mode, included in the HDDs 100-0 and 100-1, is checked using a verify command. Namely, in the warning mode, only the HDD in the normal mode is checked, unlike the normal time, in order to make the other HDD in the warning mode as inaccessible as possible. In a narrow sense, this check differs from consistency determination. Therefore, it is called simplified consistency determination.

SECOND EMBODIMENT

Figure 6:
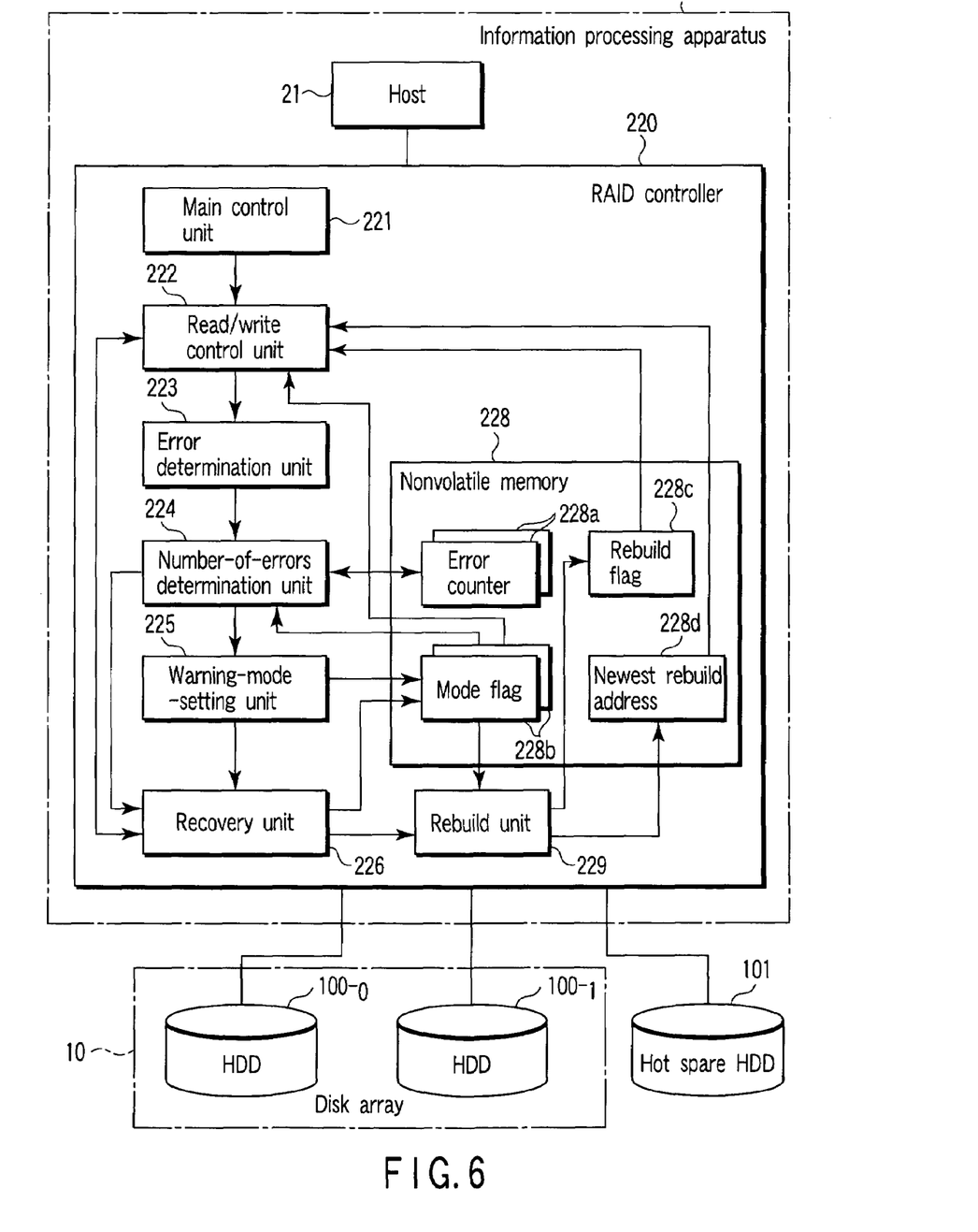
FIG. 6 is an exemplary block diagram showing the configuration of an information processing system according to a second embodiment of the invention.

A second embodiment of the invention will now be described. FIG. 6 is a block diagram showing the configuration of an information processing system according to the second embodiment. In FIG. 6, elements similar to those of FIG. 1 are denoted by corresponding reference numerals.

The system of FIG. 6 differs from that of FIG. 1 in the following points. Firstly, in the system of FIG. 6, an information processing apparatus 200 incorporating a RAID controller 220 is employed instead of the information processing apparatus 20 shown in FIG. 1. The RAID controller 220 of the information processing apparatus 200 is beforehand connected to a hot spare HDD 101, as well as to the disk array 10.

The RAID controller 220 incorporates a rebuild unit 229. The rebuild unit 229 executes a rebuild process when one of the HDDs 100-0 and 100-1 incorporated in the disk array 10 is set in the warning mode or failure mode. In the rebuild process, the data of an HDD set in the warning mode or failure mode is rebuilt in the hot spare HDD 101, using the remaining normal HDD of the disk array 10. The rebuild process is performed while, for example, incrementing the address Ai of each of the normal HDD and hot spare HDD 101 from block address 0 to maximum block address MAX. Alternatively, the rebuild process may be performed while decrementing the address Ai from maximum block address MAX to block address A0.

In the RAID controller 220, a preset area of the nonvolatile memory 228 is used to hold a rebuild flag 228c and newest rebuild address (block address) 228d. The rebuild flag 228c indicates the rebuild status set by the rebuild unit 229. The newest rebuild address 228d indicates the address (block address) of the newest rebuilt block (block area).

Figure 7A:
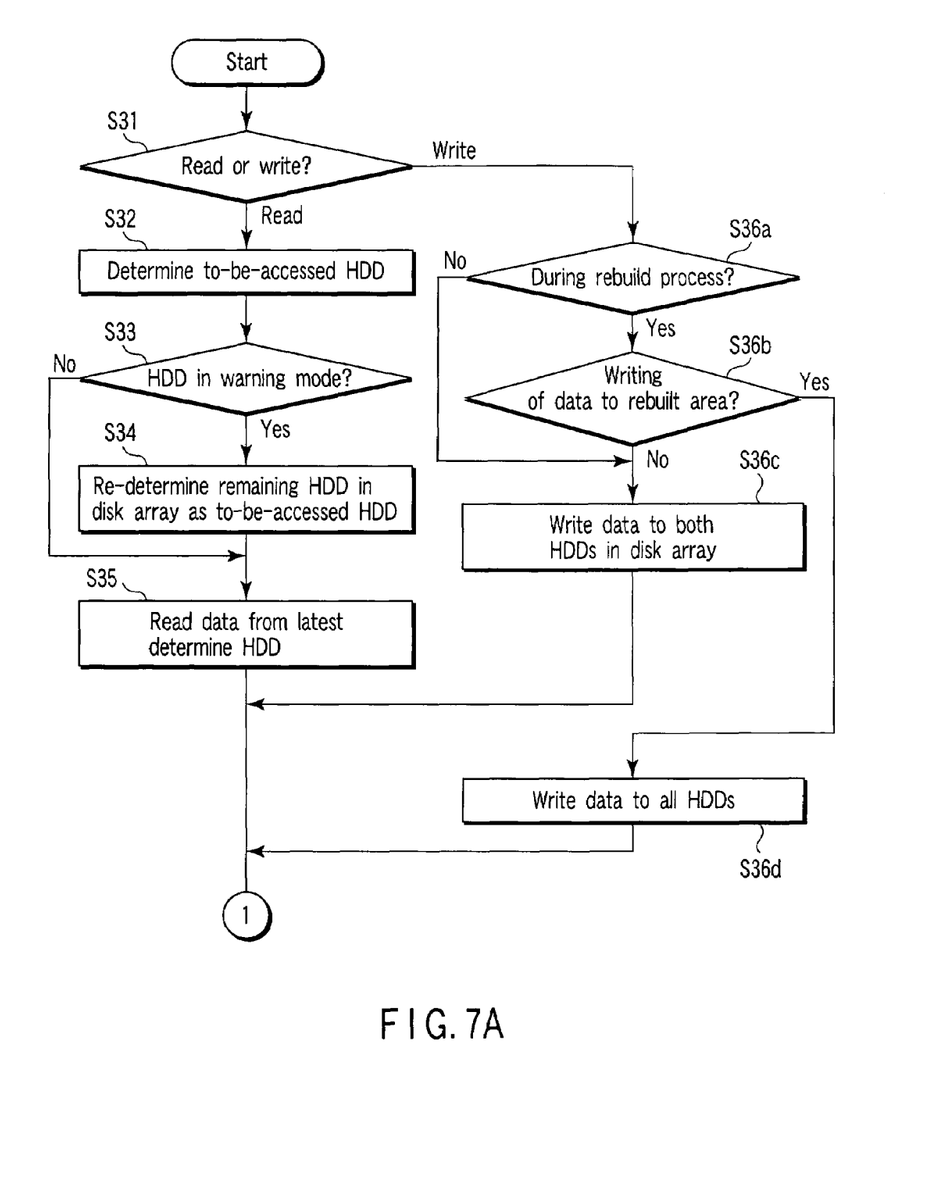
FIG. 7A is an exemplary flowchart showing part of the procedure for operating a RAID controller 220 in the second embodiment.
Figure 7B:
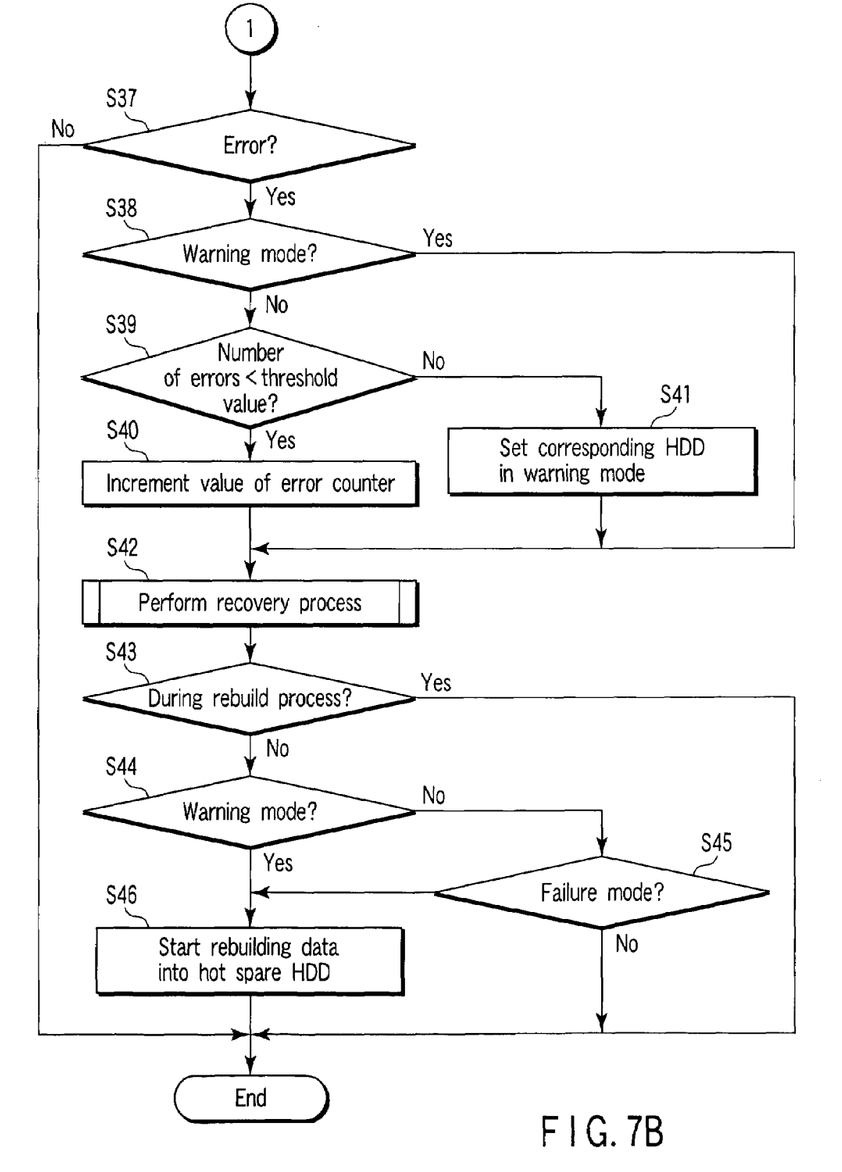
FIG. 7B is an exemplary flowchart showing the other part of the procedure for operating the RAID controller 220 in the second embodiment.
Figure 8A:
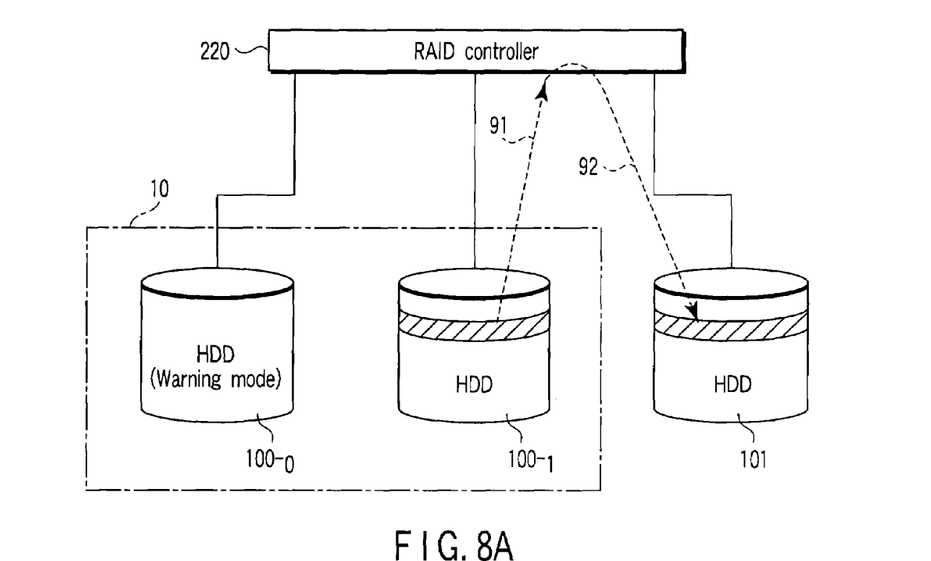
FIGS. 8A and 8B are views useful in explaining an exemplary rebuild process performed in the second embodiment.
Figure 8B:
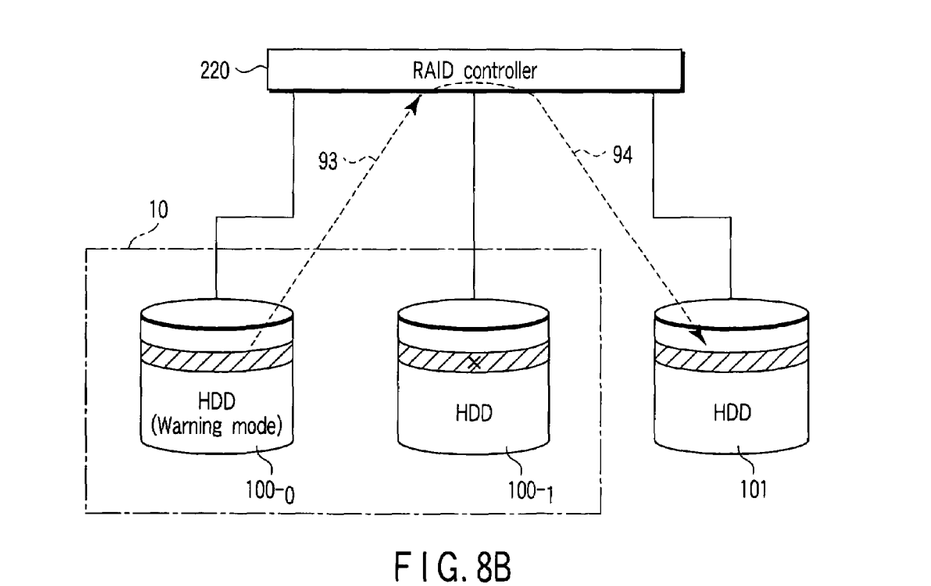

Referring to FIGS. 7A, 7B, 8A and 8B, a description will be given of the procedure for operating the RAID controller 220 in the system of FIG. 6, using, as an example, the case where the main control unit 221 in the RAID controller 220 receives a read or write command from the host 21. FIGS. 7A and 7B are flowcharts showing the procedure, and FIGS. 8A and 8B are views useful in explaining the rebuild process.

Upon receiving a read or write command from the host 21, the main control unit 221 requests the read/write control unit 222 to read or write data in accordance with the read or write command. The read/write control unit 222, in turn, determines whether data reading or data writing is requested (step S31).

If data reading is requested, the read/write control unit 222 determines which one of the HDDs 100-0 and 100-1 should be accessed (step S32). Subsequently, the read/write control unit 222 determines whether the determined HDD is set in the warning mode (step S33). If the determined HDD is set in the warning mode, the read/write control unit 222 re-determines, as the to-be-accessed HDD, the remaining HDD in the disk array 10 to make the determined HDD as inaccessible as possible(step S34).

If the read/write control unit 222 re-determines the to-be-accessed HDD (step S34), it controls reading of data from the re-determined HDD (step S35). In contrast, if the HDD determined at step S32 is not set in the warning mode (step S33), the read/write control unit 222 controls reading of data from the HDD determined at step S32 (step S35). Thus, when data reading is requested, the read/write control unit 222 executes steps S32 to S35 corresponding to steps S2 to S5 of the first embodiment, thereby preventing reading data from the HDD in the warning mode.

On the other hand, when data writing is requested by the host 21, the read/write control unit 222 determines whether the rebuild unit 229 is executing a rebuild process (step S36a). Whether the rebuild process is now being executed can be determined by referring to the rebuild flag 228c. If the rebuild process is now being executed, the read/write control unit 222 determines whether the requested data writing means writing of data to an already rebuilt area (step S36b).

Specifically, firstly, the read/write control unit 222 refers to the newest rebuild address 228d held in the preset area of the nonvolatile memory 228, and compares the newest rebuild address 228d with the block address of the last position of the requested area (the area to which data should be written). From the comparison, it is determined whether the block address of the last position of the requested area is not more than the newest rebuild address 228d. In this embodiment, if the block address of the last position is not more than the newest rebuild address 228d, it is determined that the requested writing process is writing of data to the rebuilt area. If, on the other hand, the block address of the last position is more than the newest rebuild address 228d, the requested writing process is not writing of data to the rebuilt area.

If the requested writing process is not writing of data to the rebuilt area, the read/write control unit 222 controls writing of data to both the HDDs 100-0 and 100-1 of the disk array 10 (step S36c). If the requested writing process is writing of data to the rebuilt area, the read/write control unit 222 controls writing of data to both the HDDs 100-0 and 100-1 of the disk array 10, and also controls writing of data to the hot spare HDD 101 (step S36d). Namely, the read/write control unit 222 performs simultaneous writing of the same data to the corresponding block areas of the HDDs 100-0 and 100-1 and hot spare HDD 101. As a result, data redundancy is maintained between the HDDs 100-0 and 100-1, and the consistency of data is realized between the HDD 100-0 and the hot spare HDD 101.

After executing data reading at step S35 or data writing at step S36c or S36d, the error determination unit 223 determines whether an error has occurred during the data reading or writing process (step S37). When the error determination unit 223 determines occurrence of an error, the number-of-errors determination unit 224 determines whether the HDD in which the error has occurred is set in the warning mode (step S38).

If the HDD in which the error has occurred is not set in the warning mode, the number-of-errors determination unit 224 determines whether the number of errors is less than a preset threshold value indicated by the error counter 228a corresponding to the HDD with the error (step S39). If the number of errors is less than the threshold value, the number-of-errors determination unit 224 increments the value of the error counter 228a (step S40). In contrast, if the number of errors is not less than the threshold value (step S39), the warning-mode-setting unit 225 sets the HDD with the error in the warning mode (step S41).

The recovery unit 226 is activated when the number-of-errors determination unit 224 has executed step S40. The recovery unit 226 is also activated when the warning-mode-setting unit 225 has executed step S41. The recovery unit 226 is also activated when the number-of-errors determination unit 224 determines at step S38 that the HDD with the error is already set in the warning mode. When activated, the recovery unit 226 executes a recovery process for recovery from the error in the same procedure as in the first embodiment (i.e., the procedure shown in FIG. 4) (step S42).

After the recovery unit 226 has completed the recovery process, the rebuild unit 229 determines whether it is executing a rebuild process (step S43). If the rebuild unit 229 is not executing the rebuild process, it determines whether there is an HDD set in either the warning mode or the failure mode (steps S44 and S45). This determination is achieved by referring to the mode flags 228b corresponding to the HDDs 100-0 and 100-1.

If there is an HDD set in the warning mode or the failure mode, the rebuild unit 229 starts a rebuild process for rebuilding, in the hot spare HDD 101, the data of the HDD set in the warning mode or the failure mode (step S46). Assume here that the HDD 100-0 is set in the warning mode and the HDD 100-1 is set in the normal mode. In this case, the rebuild process is performed by iterating data reading 91 and data copying 92 while incrementing the address Ai of each of the HDDs 100-1 and 101 from block address 0 to maximum block address MAX, as is shown in FIG. 8A. During data reading 91, data is read from the area of a preset size in the HDD 100-1, which is designated by the address (block address) Ai. During data copying 92, the data read from the HDD 100-1 is copied to the area in the hot spare HDD 101, which is designated by the address Ai. This rebuild process is also performed when, for example, the HDD 100-0 is set in the failure mode and the HDD 100-1 is set in the normal mode.

However, the content of the rebuild process differs between the warning mode and the failure mode as follows: Firstly, the HDD in the failure mode is separated from the disk array 10. In contrast, the HDD in the warning mode continues to be a member of the disk array 10 even in the rebuild process.

Therefore, in the second embodiment, when the HDD 100-0 is set in the warning mode as in the example of FIG. 8A and an error has occurred during reading 91 of data from the HDD 100-1, the rebuild process is continued using the data in the HDD 100-0 corresponding to the error occurrence area of the HDD 100-1. FIG. 8B shows this. In this case, instead of reading 91 of data from the HDD 100-1 as shown in FIG. 8A, reading 93 of data from the HDD 100-0 set in the warning mode is performed. Subsequently, copying 94, to the hot spare HDD 101, of the data read from the HDD 100-0 by data reading 93 is performed. At this time, the data in the error occurrence area (indicated by mark x in FIG. 8B) of the HDD 100-1 can be restored using the data read by data reading 93. After performing data copying 94, the block address is updated (switched), and reading 91 of data from the HDD 100-1 and copying 92 of the read data to the hot spare HDD 101 are performed again as shown in FIG. 8A.

On the other hand, if the rebuild unit 229 is executing a rebuild process (step S43), or if the HDD 100-0 or 100-1 is in neither the warning mode nor the failure mode (steps S44 and S45), a new rebuild process is not executed.

As described above, in the second embodiment, when an HDD, e.g., the HDD 100-0, which is likely to fail, is detected in the disk array 10, the HDD 100-0 is set in the warning mode. At this time, a rebuild process is executed on the hot spare HDD 101, making the HDD 100-0 as inaccessible as possible and without degrading the redundancy of the disk array 10. Moreover, in the second embodiment, the time when the HDD 100-0 actually fails is retarded by making the HDD 100-0 as inaccessible as possible, thereby enabling the rebuild process on the hot spare HDD 101 to finish before the HDD 100-0 actually fails. In this case, even if an error has occurred during reading of data from the HDD 100-1 for the rebuild process, the corresponding data in the HDD 100-0 can be used for the rebuild process performed on the hot spare HDD 101.

Thus, in the second embodiment, a rebuild process can be performed on the hot spare HDD 101 without degrading the redundancy of the disk array 10. Accordingly, even if the disk array 10 is RAID0 with no redundancy, in which an error that can be overcome by a retry operation occurs, data in an HDD incorporated in the disk array 10 can be rebuilt in the hot spare HDD 101.

In the second embodiment, the error counter 228a, mode flag 228b, rebuilt flag 228c and newest rebuild address 228d are stored in the nonvolatile memory 228. However, the error counter 228a, mode flag 228b, rebuilt flag 228c and newest rebuild address 228d may be stored in a particular area, called, for example, a system area, which is included in each of the HDDs 100-0 and 100-1 and is not recognized by the host 21.

Modification of Second Embodiment

In the second embodiment, it is assumed that the disk array 10 comprises two HDD 100-0 and 100-1 and functions as a RAID1 disk array (i.e., mirroring disk array). However, the number of HDDs incorporated in the disk array may exceed two, and the RAID level is not limited to RAID1.

Figure 9:
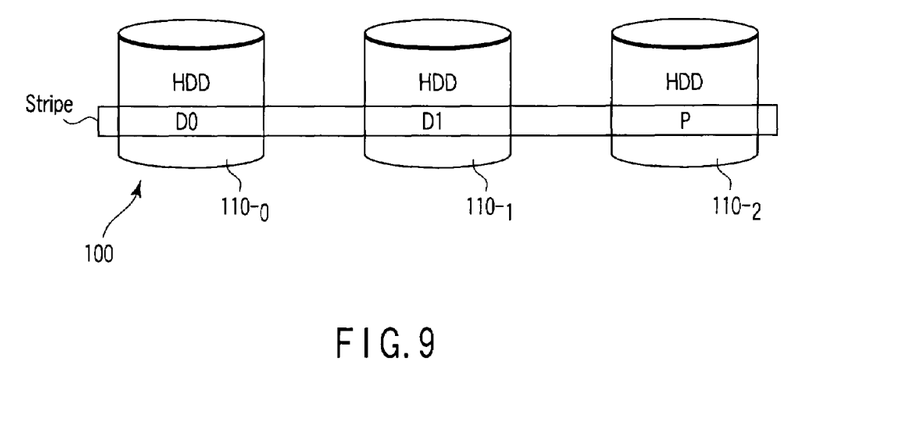
FIG. 9 is an exemplary view showing the configuration of a disk array 100 used in a modification of the second embodiment instead of the disk array 10 of FIG. 6.

Referring to FIG. 6, a description will be given of a modification of the second embodiment which employs a disk array of a RAID level other than RAID1. FIG. 9 shows a disk array 100 used in the system of FIG. 6 instead of the disk array 10. Assume that the disk array 100 comprises three HDDs, i.e., HDDs 110-0, 110-1 and 110-2. When necessary, the disk array 10 in FIG. 6 may be replaced with the disk array 100.

In the modification, assume that the disk array 100 is used at the RAID5 level. In this case, the HDDs 110-0 to 110-2 are used for storing data and parity data (redundant data). The parity data is distributed to the HDDs 110-0 to 110-2. Note that if the disk array 100 is used at the RAID3 level, two of the HDDs 110-0 to 110-2 are used to store data (used as data disks), and the remaining one HDD is used to store parity data (used as a parity disk).

The disk area of the disk array 100 realized by the HDDs 110-0 to 110-2 is divided into a plurality of stripes and managed in units of stripes as shown in FIG. 9. Each stripe is formed of block areas of the HDDs 110-0 to 110-2 that have the same relative position. To facilitate the description, assume that the block size of each of the HDDs 110-0 to 110-2 that provide one stripe is one block. In this case, data items D0 and D1 are stored in two blocks included in the blocks of the HDDs 110-0 to 110-2 providing one stripe, and parity data P related to data items D0 and D1 is stored in the remaining one block. The parity data P is generated by the exclusive OR (XOR) of data items D0 and D1.

Figure 10:
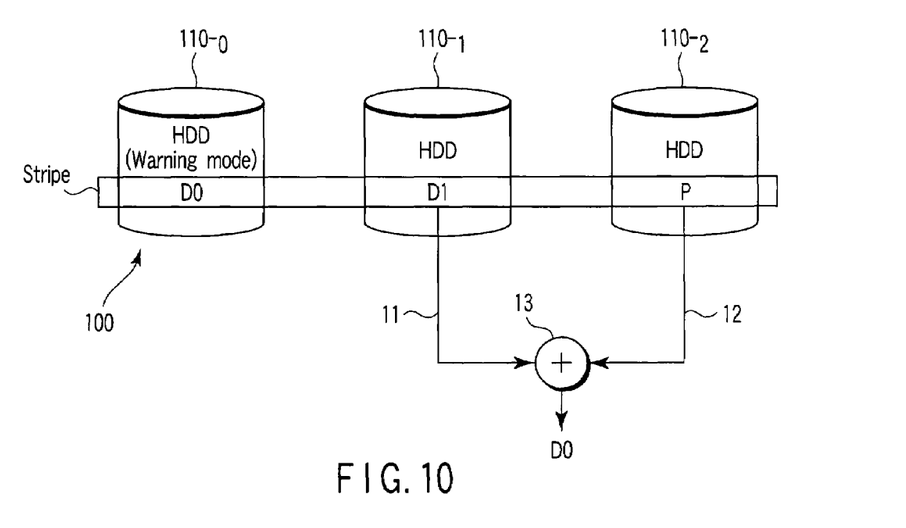
FIG. 10 is a view useful in explaining an exemplary data read operation performed when an HDD 110-0 included in the disk array 100 of FIG. 9 is set in a warning mode and a request to read data D0 from the HDD 110-0 is issued from a host to the RAID controller.

In the disk array 100 of FIG. 9, assume that one of the HDDs 110-0 to 110-2, e.g., the HDD 110-0, is set in the warning mode. In this case, the HDD 110-0 is controlled to be as inaccessible as possible, compared to the other HDDs, as in the first and second embodiments. Referring now to FIG. 10, a description will be given of the data read operation performed when the HDD 110-0 is set in the warning mode and a request to read data D0 from the area storing the same is issued from the host 21 to the RAID controller 220.

When reading of data D0 from the corresponding area is requested, the read/write control unit 222 of the RAID controller 220 executes a process corresponding to step S32 in FIG. 7A, thereby determining that the HDD 110-0 is a to-be-accessed HDD. Since, however, the HDD 110-0 is set in the warning mode, the read/write control unit 222 functions as a switching unit to re-determine, using a process corresponding to step S34 in FIG. 7A, that the remaining HDDs in the disk array 100, i.e., the HDDs 110-1 and 110-2, should be used as to-be-accessed HDDs. In this case, the read/write control unit 222 executes data reading 11 and data reading 12 for reading data or parity data (redundant data) from the areas that are included in the HDDs 110-1 and 110-2 and belong to the same stripe as that storing data D0, as shown in FIG. 10.

In the example of FIG. 10, data D1 and parity data (redundant data) P are read from the HDDs 110-1 and 110-2 by data reading 11 and data reading 12, respectively. At this time, the read/write control unit 222 functions as a data acquisition unit, and executes XOR operation 13 of data D1 and parity data P read from the HDDs 110-1 and 110-2, respectively, thereby rebuilding data D0. Thus, the read/write control unit 222 acquires data D0 without reading data D0 from the HDD 110-0 set in the warning mode. The rebuild unit 229 writes (copies) acquired (rebuilt) data D0 to the hot spare HDD 101.

The rebuild process by the rebuild unit 229 is similar to the above. For instance, assume that the rebuild unit 229 writes data D0 of the HDD 110-0 to the hot spare HDD 101. In this case, the rebuild unit 229 reads, from the HDDs 110-1 and 110-2, data D1 and parity data P that are related to data D0, and executes XOR operation of D1 and P, thereby rebuilding data D0. After that, the rebuild unit 229 writes rebuilt data D0 to the hot spare HDD 101.

While certain embodiments of the inventions have been described, these embodiments have been presented by way of example only, and are not intended to limit the scope of the inventions. Indeed, the novel apparatuses and methods described herein may be embodied in a variety of other forms; furthermore, various omissions, substitutions and changes in the form of the apparatuses and methods described herein may be made without departing from spirit of the inventions. The accompanying claims and their equivalents are intended to cover such forms or modifications as would fall within the scope and sprit of the inventions.

What is claimed is:

1. An array controller for controlling a disk array with redundancy including at least two disk drives, comprising:
    a read/write control unit which controls read/write access to the disk drives of the disk array;
    error counters provided for the respective disk drives, the error counters counting respective numbers of errors if errors occur when the disk drives are accessed;
    a failure estimation unit configured to detect, as a disk drive which is very likely to fail, a disk drive included in the disk array and having a high error occurrence degree based on the numbers of errors counted by the error counters; and
    a mode-setting unit which sets the detected disk drive in (i) a first mode that separates the detected disk drive from the disk array when the detected disk drive is considered to have failed and is inaccessible and (ii) a second mode in which the detected disk drive is maintained as an accessible member of the disk array and is controlled by the read/write control unit to prevent reading of data from the detected disk drive of the disk array.

2. The array controller according to claim 1, wherein the read/write control unit includes:
    a determination unit which determines whether a disk drive included in the disk array, from which data is to be read, is set in the second mode;
    a switching unit which switches a to-be-accessed disk drive from the disk drive, from which data is to be read, to a remaining disk drive included in the disk array, when the disk drive, from which data is to be read, is set in the second mode; and
    a data acquisition unit configured to acquire data to be read from the disk drive included in the disk array and set in the second mode, based on the redundancy of the disk array and data read from the remaining disk drive.

3. The array controller according to claim 2, further comprising a memory unit which stores mode flag information for designating a mode for each of the disk drives, the mode designated by the mode flag information being included in a plurality of modes which include the second mode,
    and wherein:
    when the failure estimation unit detects, as the disk drive which is very likely to fail, the disk drive included in the disk array and having the high error occurrence degree, the mode-setting unit sets, in a state for designating the second mode, the mode flag information corresponding to the disk drive having the high error occurrence degree; and
    the determination unit determines whether the disk drive from which data is to be read is set in the second mode, referring to the mode flag information corresponding to the disk drive from which data is to be read.

4. The array controller according to claim 2, further comprising a recovery unit configured to acquire data to be read from a disk drive which is included in the disk array and is not set in the second mode, when a medium error occurs during a read operation of reading data from the disk drive which is not set in the second mode, the medium error making it impossible to correctly read data from the disk drive in which the medium error occurs, the recovery unit reading data from the remaining disk drive which is included in the disk array and exclude the disk drive in which the medium error occurs, regardless of whether the remaining disk drive is set in the second mode, the recovery unit acquiring data to be read from the disk drive in which the medium error occurs, based on the data read from the remaining disk drive and the redundancy of the disk array.

5. The array controller according to claim 4, wherein the recovery unit recovers, using the acquired data, data stored in a medium-error-occurrence area of the disk drive in which the medium error occurs.

6. The array controller according to claim 2, further comprising a consistency check unit configured to check consistency of the disk drives of the disk array.

7. The array controller according to claim 6, wherein the consistency check unit includes:
    a verify-command execution unit configured to check, when the detected disk drive included in the disk array is set in the second mode, at least the remaining disk drive which is included in the disk array and excluding the disk drive set in the second mode, using a verify command which does not accompany a transfer of data to the disk drive set in the second mode; and
    a data restoration unit configured to restore, when a disk drive included in the disk array reports an occurrence of an error in response to the verify command, data of the disk drive which reports the occurrence of the error, the data restoration unit reading data from the disk drive that is set in the second mode and using the data from the disk drive set in the second mode to restore the data of the disk drive which reports the occurrence of the error.

8. The array controller according to claim 2, wherein the array controller is connected to a spare disk drive as well as the disk array,
    and further comprising a rebuild unit configured to execute, when the detected disk drive is set in the second mode, a rebuild process for rebuilding, in the spare disk drive, data of the detected disk drive, the rebuild unit reading data from the remaining disk drive which is included in the disk array and excluding the detected disk drive, and rebuilding, in the spare disk drive, the data of the detected disk drive based on the data read from the remaining disk drive and the redundancy of the disk array.

9. The array controller according to claim 8, wherein only when a medium error which makes it impossible to correctly read data occurs during the rebuild process, the rebuild unit reads data from the disk drive set in the second mode, and rebuilds, in the spare disk drive, the data of the disk drive set in the second mode, utilizing the data read by the rebuild unit.

10. The array controller according to claim 1, wherein the mode-setting unit prevents reading of data by preventing read operations from being performed on the detected disk drive when the detected disk drive is placed in the second mode.

11. An information processing apparatus comprising:
a host system which utilizes, as an external storage device, a disk array with redundancy including at least two disk drives; and
an array controller which controls the disk array, wherein the array controller includes:
  a main control unit which receives a read/write request from the host system;
  a read/write control unit which controls read/write access to the disk drives requested by the read/write request received by the main control unit;
  error counters provided for the respective disk drives, the error counters counting respective numbers of errors if errors occur when the disk drives are accessed;
  a failure estimation unit configured to detect, as a disk drive which is very likely to fail, a disk drive included in the disk array and having a high error occurrence degree based on the numbers of errors counted by the error counters; and
  a mode-setting unit which sets the detected disk drive in (i) a first mode that separates the detected disk drive from the disk array causing the detected disk drive to be inaccessible when the detected disk drive is considered to have failed and (ii) a second mode in which the detected disk drive is maintained as an accessible member of the disk array and is controlled by the read/write control unit to prevent reading of data from the detected disk drive of the disk array.

12. The information processing apparatus according to claim 11, wherein the read/write control unit includes:
  a determination unit which determines whether a disk drive included in the disk array, from which data is to be read, is set in the second mode;
  a switching unit which switches a to-be-accessed disk drive from the disk drive, from which data is to be read, to a remaining disk drive included in the disk array, when the disk drive, from which data is to be read, is set in the second mode; and
  a data acquisition unit configured to acquire data to be read from a disk drive included in the disk array and set in the second mode, based on the redundancy of the disk array and data read from the remaining disk drive.

13. The information processing apparatus according to claim 11, wherein the mode-setting unit prevents reading of data by preventing read operations from being performed on the detected disk drive when the detected disk drive is placed in the second mode.

14. A method comprising:
  counting a number of errors that occur when a disk drive is accessed, the disk drive being included in a disk array;
  detecting when the disk drive is likely to fail based on the number of errors counted;
  setting the detected disk drive in a first mode upon the detected disk drive being considered to have failed when the number of errors counted exceeds a first error count value, the detected disk drive is inaccessible and is separated from the disk array when placed into the first mode; and
  setting the detected drive in a second mode when the number of errors counted exceeds a second error count value, the second error count value being less than the first error count value, the detected drive is an accessible member of the disk array when placed in the second mode but is controlled to prevent reading of data from the detected disk drive.

15. The method according to claim 14 further comprising:
  issuing a warning to inform of an increase in the number of errors counted has now exceeded the second error count value.

16. The method according to claim 14, wherein the setting the detected drive in the second mode controls the detected drive to be more inaccessible than when the detected disk drive is in a normal mode by the preventing of the reading of data, the preventing of the reading of data is performed by preventing read operations from being performed on the detected drive.

* * * * *